Figure 1:
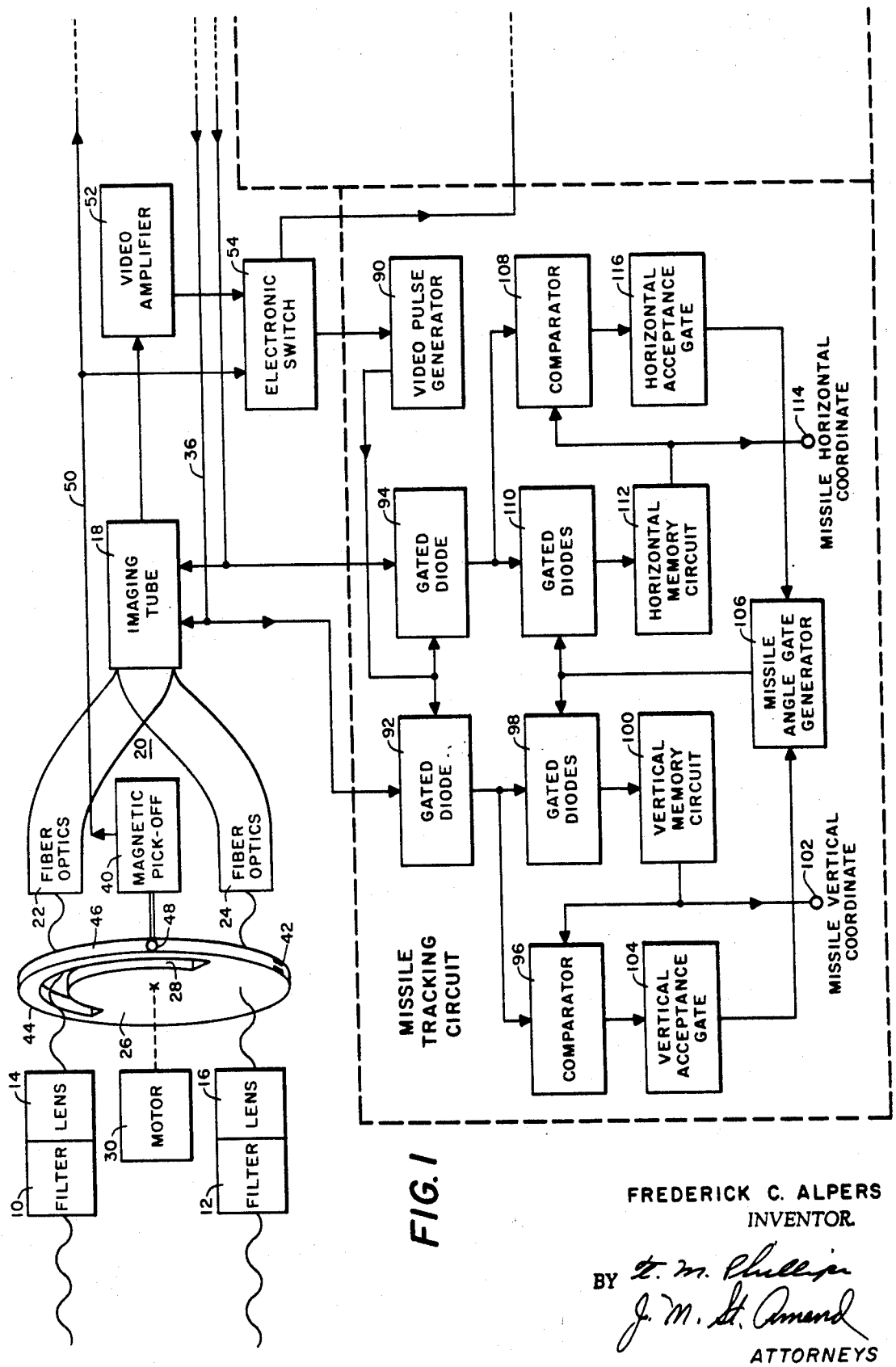

United States Patent [19]
Alpers

[11] 3,761,612
[45] Sept. 25, 1973

[54] SIMULTANEOUS MISSILE AND TARGET ELECTRO-OPTICAL TRACKING SYSTEM

[75] Inventor: Frederick C. Alpers, Riverside, Calif.

[73] Assignee: The United States of America as represented by the Secretary of the Navy, Washington, D.C.

[22] Filed: Feb. 18, 1965

[21] Appl. No.: 434,741

[52] U.S. Cl. ..... 178/6.8, 178/DIG. 21, 250/203 CT
[51] Int. Cl. .............................................. H04n 3/04
[58] Field of Search ..................... 178/6.8, DIG. 21; 250/202, 203, 203 CT

[56] References Cited
UNITED STATES PATENTS
3,651,326  3/1972  Alpers.................................. 178/6.8

Primary Examiner—Benjamin A. Borchelt
Assistant Examiner—H. A. Birmiel
Attorney—G. J. Rubens, J. M. St. Amand and T. M. Phillips

[57] ABSTRACT

A missile and target electro-optical tracking system which utilizes the same imaging tube and scanning signal for deriving both target and missile angular coordinate information. A two channel optical system is positioned in front of the imaging tube and each image is alternately allowed to pass to the face of the imaging tube.

6 Claims, 2 Drawing Figures

FREDERICK C. ALPERS
INVENTOR.

SIMULTANEOUS MISSILE AND TARGET ELECTRO-OPTICAL TRACKING SYSTEM

The invention herein described may be manufactured and used by or for the Government of the United States of America for governmental purposes without the payment of any royalties thereon or therefor.

The present invention relates to simultaneous missile and target electro-optical tracking systems and in particular to a system wherein a separate optical path is provided for the target and missile images respectively, but the same sensor element is used for both.

In a weapon system in which electro-optical equipment is used to implement automatic command quidance of a missile, the system must provide accurate tracking of not only the target but also a missile en route to the target. On the basis of the relative angular bearings of the two, a computer can dtermine the corrections in the missile course which are required to cause the missile to hit the target, and can generate command signals embodying these corrections for transmission to the missile via a command link.

The present invention provides a tracking system which utilizes the same imaging tube and scanning signal for deriving both target and missile angular coordinate information without resorting to electrical boresighting nor maintenance of precise boresighting conditions throughout flight. Optical alignment of the two lens is necessary, but is accomplished and mechanically locked in place at the factory. The missile to be tracked in conjunction with the system embodying the invention should carry a monochromatic flare and is distinguished from other objects in the field of view on this basis.

A system in which this device may be used is disclosed in my co-pending application Ser. No. 303,690, filed Aug. 21, 1963.

An object of the present invention is to provide an improved optical tracking system.

Another object of the invention is to provide an optical tracking system which will provide coordinate tracking information on a target and the pursuing missile simultaneously.

A further object of the invention is the provision of an optical tracking system which will provide coordinate tracking information on a target and the pursuing missile simultaneously wherein target and missile scanning images appear alternately on the same imaging tube without the one interfering with the other.

Still another object of the invention is the provision of an optical tracking system which will provide coordinate tracking information on a target and the pursuing missile simultaneously wherein target and missile scanning images appear alternately on the same imaging tube without the one interfering with the other and each having its own independent lens aperture, filter and viewing angle.

Figure 2:
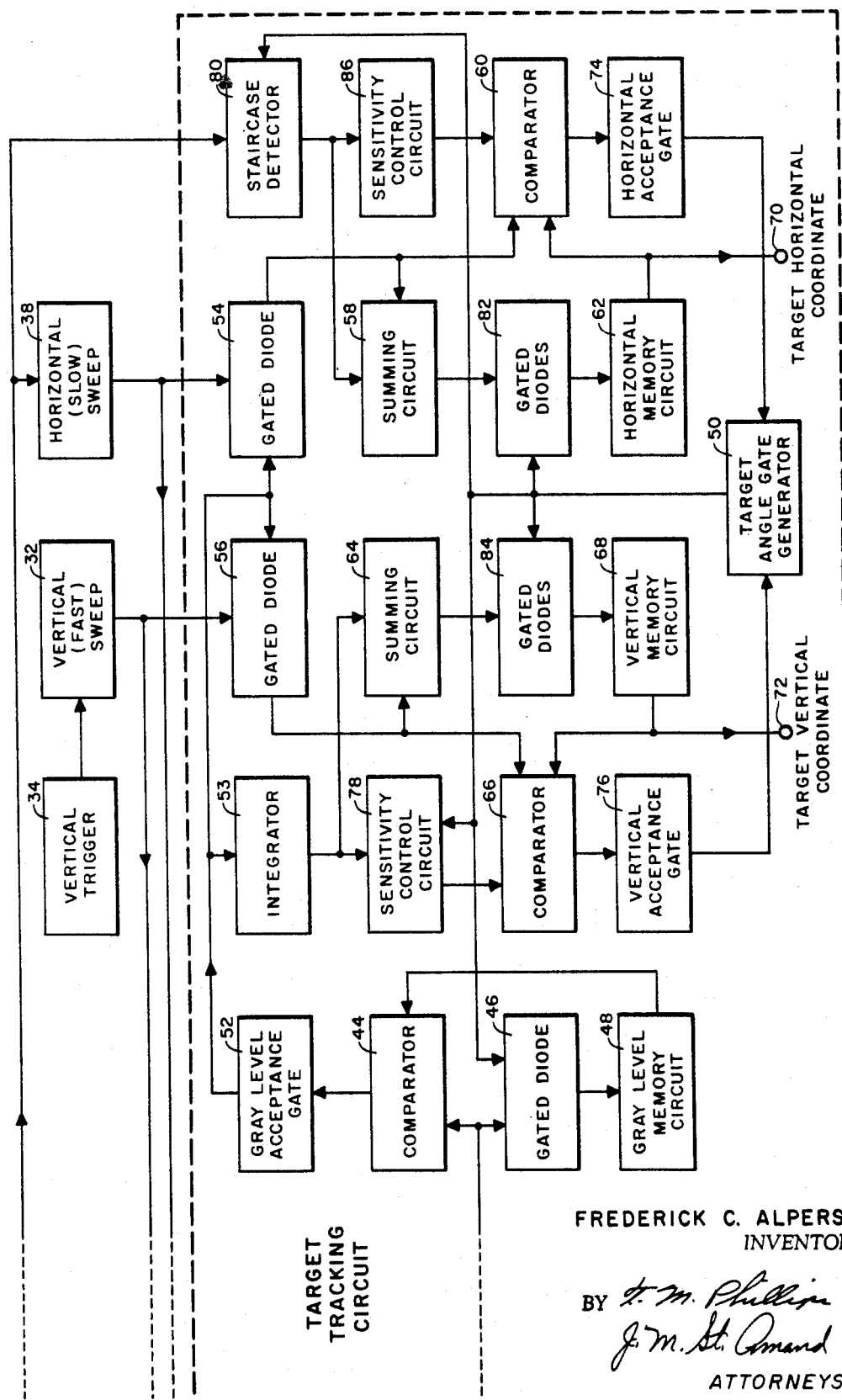

Other objects and many of the attendant advantages of this invention will become readily appreciated as the same becomes better understood by reference to the following detailed description when considered in connection with the accompanying drawings wherein:

FIGS. 1 and 2 are a block diagram of a tracking circuit embodying the invention.

Referring now to the drawing there is shown a two channel optical system for receiving energy emitted from a target and a pursuing missile. Each optical path includes an optical filter 10, 12 and zoom lens 14, 16. The optical filters are complementary in their spectral transmission characteristics; that is, the filter in the optical path associated with the missile passes only light which falls within a selected narrow portion of the optical spectrum, while the filter in the path associated with the target passes all other optical wavelengths of light but rejects light in the selected portion of the spectrum. Each of the filter lens combinations may be mounted on a stabilized platform, not shown, which would permit independent action of the two optical paths.

The two optical paths are led to a single imaging tube through a Y-type fiber optic cable 20. The ends 22, 24 of the cable 20 should be ground optically flat so that the images from the lenses 14, 16 may be focused directly upon them. The common or ouput end of cable 20 should also be ground optically flat and placed against the face plate of imaging tube 18. The adjoining rows of fibers comprising the common end of cable 20 should be taken alternately from opposite branches of the Y section of cable 20.

The images present at lenses 14, 16 are scanned on alternate frames by tube 18. Alternation between the two is achieved by use of rotating disc 26 containing a slot 28 that allows light to pass first between lens 14 and planar end 22 of cable 20, and then between lens 16 and planar end 24. As a result, the target scene and the missile scene appear alternately on the face plate of imaging tube 18 during each revolution of disc 26. Disc 26 is driven by a synchronous or constant speed motor 30. Vertical scanning is preferred instead of horizontal scanning to provide a more optimum raster for air-to-surface missile application and is provided by vertical sweep generator 32 which is triggered by vertical trigger circuit 34. The output of vertical sweep generator 32 is coupled to imaging tube 18 through lead 36. The horizontal (slow) sweep is provided by horizontal sweep generator 38 and is triggered by the output from a magnetic pick-off 40 adjacent to disc 26. Synchronization of the scanning raster with the rotation of disc 26 and maintaining optimum phasing between the two, is had by affixing two magnets 42, 44 diametrically opposite each other on rim 46 of disc 26. Magnets 42, 44 move past a fixed magnetic pick-off element 40 which generates trigger pulses that are applied to horizontal sweep generator 38 through lead 50.

Scanning of imaging tube 18 generates video signals which are amplified in the conventional manner in video amplifier 52. The output from video amplifier 52 is fed through electronic switch 54 where the video signals from the target imaging frames are separated from those of the missile imaging frames. Switch 54 may consist of a pair of gated diodes or gated amplifiers, which may be controlled respectively by the opposing sides of a bistable multivibrator. Switch 54 is synchronized to the scanning frame rate by the trigger pulse from magnetic pick-off 40. In order to prevent switch 54 from becoming synchronized in opposite phase from slot 28, magnets 42 and 44 may be made to differ in polarization or other characteristic so that the trigger pulses from magnetic pick-off 40 as magnet 42 passes are distinguishable from those generated as magnet 44 passes.

Signals received at electronic switch 54 that are from the target are fed to the target tracking circuit at comparator 44 and gated diodes 46. The target tracking circuit may be the same as that shown and described in FIG. 1 of my copending application Ser. No. 434,740 filed Feb. 18, 1965. Target information is only permitted to flow to gray level memory circuit 48 when gated diodes 46 are gated open by the output from target angle gate generator 50. The output signal from gray level memory circuit 48 is fed to comparator 44 where each new target signal is compared with the preceding stored signal. If a sufficient difference exists between the stored and new signal, an output signal from comparator 44 is fed to gray level acceptance gate 52 which serves to prevent generation of an output gate signal. If, on the other hand, the stored and new signals reaching comparator 44 are essentially equal, the output from the comparator is such that a gray level acceptance gate signal is generated. The signal from gate 52 is fed to the horizontal tracking circuit at gated diode 54 and to the vertical tracking circuit at gated diode 56.

When gated diode 54 is gated on by a signal from gate generator 52, the horizontal sweep voltage from sweep generator 38 is fed to summing circuit 58 and comparator 60. The instantaneous values of horizontal sweep voltages are compared in comparator 60 with the memory circuit voltage from memory circuit 62. When gated diode 56 is gated on by the signal from gate generator 52, the sweep voltage from sweep generator 32 is fed to summing 64 and comparator 66. The instantaneous value of vertical sweep voltages are compared in comparator 66 with the memory circuit voltage from memory circuit 68. The output voltage from horizontal memory circuit 62 appearing at terminal 70 is the target horizontal coordinate and the output voltage from vertical memory circuit 68 appearing at terminal 72 is the target vertical coordinate.

The output from comparator 60 is fed to horizontal acceptance gate 74 and the output from comparator 66 is fed to vertical acceptance gate 76. Target angle gate generator 50 generates gate signals in response to output signals from horizontal acceptance gate 74 and vertical acceptance gate 76, but only when the two are present simultaneously. With this arrangement the target angle gate generator yields an output only when the scanning is in the vicinity of the target as remembered in memory circuits 62 and 68. The target angle gate output is fed to gated diodes 46, sensitivity control circuit 78, staircase detector 80, gated diodes 82 and gated diodes 84. As described in my above-referenced co-pending application, the gate signals from the angle gate generator cause the several gated diodes to be open and to pass correction signals to the respective memory circuits only when those signals pertain to the target being tracked, and similarly cause the staircase detector and sensitivity control circuits to function only when the signals present pertain to said target.

Center tracking in the vertical plane is obtained by means of integrator 53 and summing circuit 64. Integrator 53 is controlled by the input from gray level acceptance gate 52 and accumulates voltages passed at a uniform rate, but is discharged quickly as soon as the acceptance gate ceases. Short sawtooth waveforms of uneven duration and amplitude then appear at the output of integrator 53 as the horizontal sweep traces across successive portions of the selected target image or across areas exhibiting the same gray level as the target. Integrator 53 should be designed so that the polarity of its output waveforms is negative (or opposite to that of the sweep voltage used in the vertical tracking channel) and the charging rate should be one-half that of the sweep voltage. Each output waveform from integrator 53 is summed in summing circuit 64 with its respective gated portion of the sweep voltage, thus producing a trapezoidal waveform which begins with a voltage directly related to the horizontal position of the beam in the raster at that instant (the deflection voltage plus zero voltage from integrator 53), which rises at a rate equivalent to one half the rate of scan (the deflection voltage rate change summed with minus one half that rate of change from integrator 53), and which, upon the termination of the gray level acceptance gate, has reached only a peak value related to the center position of the beam within that particular gated position of the sweep.

When the sweep crosses the target being tracked, angle gate generator 50 generates an output signal which turns on gated diodes 84. A voltage is then fed to vertical memory circuit 68 representing the center coordinate of the target which remains after the scan over the target is complete.

The output from integrator 53 is also fed into sensitivity control circuit 78 which may be a peak detector operating on the output from integrator 53, but only when the signal from gate generator 50 is present which would indicate that the passage of the scanning beam is over the target rather than some other area which exhibits the same gray level as the target. This peak voltage is retained until the next scanning frame and controls the sensitivity of comparator 66, as previously described, in order that the outer areas of the target as well as the center point may be brought within the angle gate. The gains of sensitivity control 78 and comparator 66 should be such that comparator 66 will accept a new target width which is slightly larger than the preceding one.

The missile-tracking circuitry functions on the same basic coordinate-determining principles as the target-tracking circuitry, but does not need a gray level tracking channel or provisions for determining the center coordinate of the missile. Video signals enter the missile-tracking circuit from electronic switch 54 and are fed to video pulse generator 90 on alternate scanning rasters when rotating disc 26 is passing the chromatically selected missile signal. Peaks in the video signal that are of sufficient amplitude to indicate that they may have been caused by the missile flare then trigger video pulse generator 90. Video pulse generator 90 should be designed to generate an output that is a fixed-amplitude, low-impedance pulse. The output from generator 90 is coupled to gated diodes 92, 94 for gating the inputs from vertical sweep generator 32 and horizontal sweep generator 38, respectively. The output from gated diode 92 is fed as a first input to comparator 96 and to gated diodes 98. The output of gated diodes 98 is fed to vertical memory circuit 100, which in turn provides an output to missile vertical coordinate terminal 102 and to the second input of comparator 96. Comparator 96 compares the two inputs and feeds a signal to vertical acceptance gate 104 which in turn provides an input to missile angle gate generator 106. The function of these memory, comparator, and gate generation circuits is that of tracking the missile in the vertical plane and is identical to the function described for corresponding circuits to track a point target in my above-referenced co-pending application.

The output from gated diode 94 is fed as a first input to comparator 108 and to gated diodes 110. The output of gated diodes 110 is fed to horizontal memory circuit 112 which provides an output to missile horizontal coordinate terminal 114 and is the second input to comparator 108. Comparator 108 compares the two inputs and feeds a signal to horizontal acceptance gate 116 which in turn provides an input to missile angle gate generator 106. Missile angle gate generator 106 supplies an output only when outputs from vertical acceptance gate 104 and horizontal acceptance gate 116 are present at the same time, and the output from generator 106 is used to control gated diodes 98 and 110. The function of comparator 108, memory 112, acceptance gate 116 and gated diodes 94 and 110 is to provide tracking of the missile in the vertical plane as described in my above-referenced co-pending application.

If desired, mirrors may be used in lieu of fiber optics 20 to focus both the target and missile images on the common imaging tube 18.

Obviously many modifications and variations of the present invention are possible in the light of the above teachings. It is therefore to be understood that within the scope of the appended claims the invention may be practiced otherwise than as specifically described.

What is claimed is:

1. In a simultaneous missile and target electro-optical tracking system for use with a missile that carries a substantially monochromatic light emitting flare, the combination comprising:
   a. an imaging tube,
   b. a two-path optical means for forming a single image on the face plate of said imaging tube,
   c. a first lens for focusing an image of the target to be tracked into one of the paths of said two-path optical means,
   d. a second lens for focusing an image of the flare associated with the missile to be tracked into the other path of said two-path optical means,
   e. means positioned between said first and second lens and said two-path optical means for causing the image focused on the face plate of said imaging tube to continuously alternate between said missile flare and the target of interest,
   f. scan generation circuit means including a horizontal voltage sweep generator and a vertical voltage sweep generator coupled to said imaging tube for electronically scanning the image focused on the face plate of said imaging tube,
   g. a synchronizing pulse generator associated with said image alternating means for generating first and second pulses,
   h. switch circuit means coupled to said imaging tube and to said synchronizing means and having a first output and a second output and being responsive to the received synchronizing pulse to connect the output of said imaging tube to said first output when the missile flare is being scanned and to connect the output of said imaging tube to said second output when said target is being scanned,
   i. a missile tracking circuit coupled to the first output of said switch circuit means for tracking said missile in response to signals received from said imaging tube,
   j. a target tracking circuit coupled to the second output of said switch circuit means for tracking said target in response to signals received from said imaging tube.

2. The system of claim 1 wherein said two-path optical means is a Y-type fiber optic cable having the ends of the two branches of the Y ground optically flat so that the images from the lenses may be focused directly upon them and having the common end of the Y ground optically flat and placed against said imaging tube face plate.

3. The system of claim 1 wherein said missile tracking circuit comprises:
   a. video pulse generator circuit means for generating an output signal in response to the scanning of an image of a missile flare on the face plate of said imaging tube,
   b. a first gate circuit means coupled to said video pulse generator and to said scan generation circuit means and being responsive to the output signal from said video pulse generator to gate the horizontal and vertical voltages that represent the horizontal and vertical coordinates of the image scanned,
   c. a second gate circuit means coupled to said first gate circuit means for passing only those gated voltages that represent approximately the same coordinate as the coordinates of missile being tracked.

4. The system of claim 1 wherein said missile tracking circuit comprises:
   a. a video pulse generator circuit coupled to the first output of said switch circuit means for generating a fixed-amplitude gating pulse in response to peaks in the received video signals that are of sufficient amplitude to indicate that they may have been caused by a missile flare,
   b. first gated circuit means coupled to said horizontal sweep generator and to said video pulse generator for gating the horizontal voltage in response to the gating pulse from said video pulse generator,
   c. a horizontal coordinate memory circuit having an output voltage that represents the horizontal coordinate of the missile being tracked,
   d. a first comparator circuit coupled to said horizontal coordinate memory circuit and to said first gated circuit means for generating an output signal when the two signals received by said comparator are substantially the same,
   e. an angle gate generator coupled to said first comparator circuit means for generating an output gating signal in response to the output signal from said comparator,
   f. second gated circuit means coupled to said first gated circuit means, said angle gate generator and said horizontal coordinate memory circuit for gating the output voltage from said first gating circuit means to said horizontal coordinate memory circuit when a gating signal is received from said angle gate generator,
   g. third gating circuit means coupled to said vertical sweep generator and to said video pulse generator for gating the vertical sweep voltage in response to the gating pulse from said video pulse generator,
   h. a vertical coordinate memory circuit having an output voltage that represents the vertical coordinate of the missile being tracked,
   i. a second comparator circuit coupled to said vertical coordinate memory circuit and to said third gating circuit means for generating an output signal when the two signals received by said second comparator are substantially the same, j. said angle gate generator being coupled to said second comparator circuit for generating an output gating signal in response to the output signal from said second comparator circuit, k. fourth gated circuit means coupled to said third gated circuit means, said vertical coordinate memory circuit means and said angle gate generator for gating the output of said third gating circuit, means to said vertical coordinate memory circuit when a gating signal is received from said angle gate generator.

5. The system of claim 1 wherein said target tracking circuit comprises:

a. gray level tracking circuit means coupled to the second output of said switch circuit means for producing an output signal that is proportional to the gray level of the target being tracked, b. a gray level discriminator means coupled to the second output of said switch circuit means and to said gray level tracking circuit means for producing an output signal when the signal received from said imaging tube is the same as the signal received from said gray level tracking circuit means, c. angle tracking circuit means coupled to said scan generator circuit means and to said gray level discriminator means for passing horizontal and vertical scan voltages in response to the signal from said gray level discriminator that represent the horizontal and vertical coordinates of objects having the same gray level as the target of interest and for then selectively passing only those voltages that represent approximately the same coordinates as the coordinates of the target of interest.

6. The system of claim 1 wherein said target tracking circuit comprises:

a. gray level tracking circuit means coupled to the second output of said switch circuit means for producing an output signal that is proportional to the gray level of the target being tracked, b. a gray level discriminator means coupled to the second output of said switch circuit means and to said gray level tracking circuit means for producing an output signal when the signal received from said imaging tube is the same as the signal received from said gray level tracking circuit means, c. first gating circuit means coupled to said gray level discriminator and to said horizontal sweep voltage generator for gating said horizontal sweep voltage in response to a gating signal from said gray level discriminator, d. horizontal coordinate memory circuit means having an output voltage that represents the horizontal coordinate of the target being tracked, e. a first comparator circuit coupled to said horizontal coordinate memory circuit means and to said first gating circuit means for generating an output signal when the two received signals are substantially the same, f. an angle gate generator coupled to said first comparator circuit for generating an output gate signal in response to the output signal from said first comparator circuit, g. second gating circuit means coupled to said first gating circuit means and to said horizontal coordinate memory circuit means for gating the output voltage of said first gating circuit means to said horizontal coordinate memory circuit means when a gating signal is received from said angle gate generator, h. third gating circuit means coupled to said gray level discriminator and to said vertical sweep voltage generator for gating said vertical sweep voltage in response to a gating signal from said gray level discriminator, i. vertical coordinate memory circuit means having an output voltage that represents the vertical coordinate of the target being tracked, j. a second comparator circuit coupled to said vertical coordinate memory circuit means and to said third gating circuit means for generating an output signal when the two received signals are substantially the same, k. said angle gate generator being coupled to said second comparator circuit for generating an output gate signal in response to the output signal from said second comparator circuit, l. fourth gating circuit means coupled to said third gating circuit means and to said vertical coordinate memory circuit means for gating the output voltage of said third gating circuit means to said vertical coordinate memory circuit means when a gating signal is received from said angle gate generator.

* * * * *